June 13, 1933. H. J. KERR 1,913,675
DEVICE FOR EVENLY DISTRIBUTING A GAS CARRYING SOLIDS IN
SUSPENSION INTO BRANCH CONDUITS
Filed March 2, 1928 3 Sheets-Sheet 1
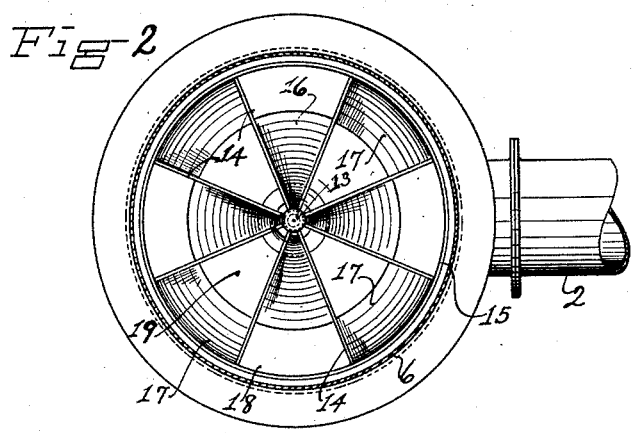
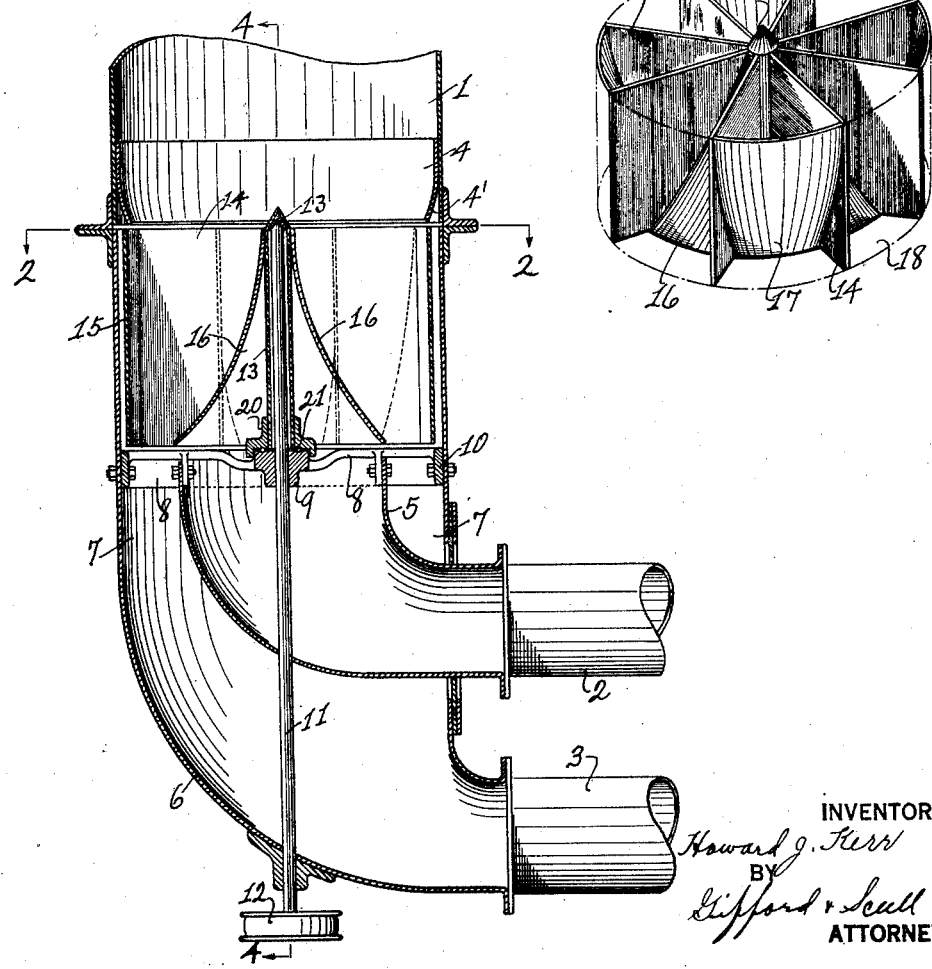
INVENTOR
Howard J. Kerr
BY
Gifford & Scull
ATTORNEYS

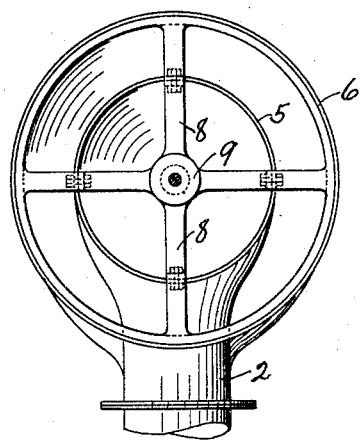
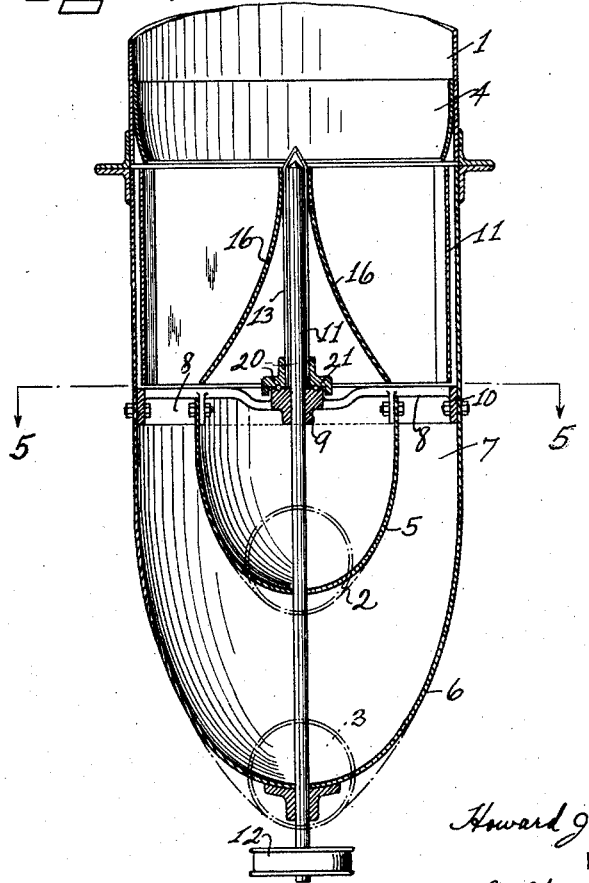

June 13, 1933.   H. J. KERR   1,913,675
DEVICE FOR EVENLY DISTRIBUTING A GAS CARRYING SOLIDS IN
SUSPENSION INTO BRANCH CONDUITS
Filed March 2, 1928   3 Sheets-Sheet 3

INVENTOR
Howard J. Kerr
BY
Gifford & Scull
ATTORNEY

Patented June 13, 1933

1,913,675

UNITED STATES PATENT OFFICE

HOWARD J. KERR, OF WESTFIELD, NEW JERSEY, ASSIGNOR, BY MESNE ASSIGNMENTS, TO FULLER LEHIGH COMPANY, A CORPORATION OF DELAWARE

DEVICE FOR EVENLY DISTRIBUTING A GAS CARRYING SOLIDS IN SUSPENSION INTO BRANCH CONDUITS

Application filed March 2, 1928. Serial No. 258,635.

Figure 7:
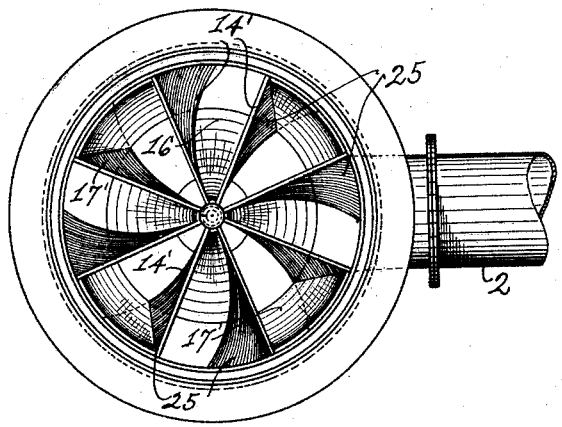
Figure 6:
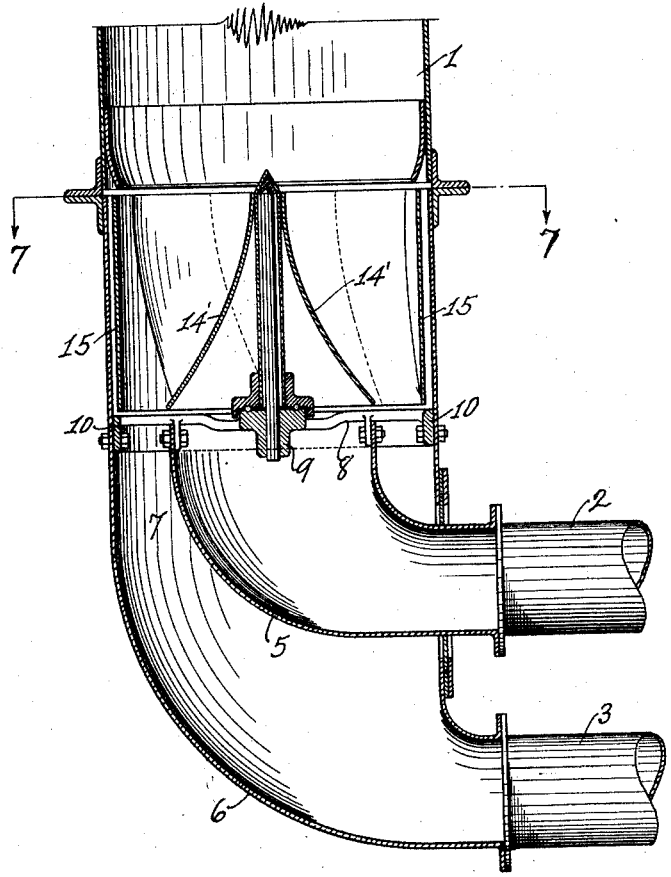

This invention relates to a device by which gases carrying solids in suspension are divided into a plurality of branches in such a manner that even if the solids are concentrated in layers along one side or other portion of the main conduit, the branch conduits will receive the material in such a manner that the solids will be more evenly distributed throughout the gas. The invention is particularly useful in connection with the distribution of powdered coal that is carried by air through a main conduit and fed to branch conduits, but is not restricted to this particular use. The invention will be understood from the description in connection with the accompanying drawings in which Fig. 1 is a vertical section through an illustrative embodiment of the invention; Fig. 2 is a section along the line 2—2 of Fig. 1; Fig. 3 is a perspective view of some of the parts; Fig. 4 is a section along the line 4—4 of Fig. 1; Fig. 5 is a section along the line 5—5 of Fig. 4; Fig. 6 is a vertical section through a modification; and Fig. 7 is a section along the line 7—7 of Fig. 6.

In the drawings reference character 1 indicates a main conduit from which branch conduits 2 and 3 lead. A short cylindrical ring 4 contacting with the inside walls of the conduit 1 has a lower converging edge 4' to cause the moving material to leave the inside surface of the conduit just before it enters a mixing device that is to be described below. The inlet 5 to the branch conduit 2 is somewhat funnel shaped and is located along the center line of the conduit 1 and the inlet to the branch conduit 3 is made of the converging walls 6 of the conduit 1 with an annular space 7 left around the upper end of the inlet 5.

A spider 8 is located at the upper end of the inlet 5 and is provided with a bearing 9 at the center. The spider 8 is connected to a rim 10 that is in turn bolted to the conduit 1, and the other end of the inlet 5 is attached to lugs on the spider 8. A central shaft 11 that is provided with a driving pulley 12 extends through the inlets 5 and 6 and bearing 9 and a mixing wheel is connected to the inner end of the shaft 11. This mixing wheel comprises a central cylindrical portion 13 that is closed at the upper end, which fits over the inner end of the shaft 11, and radial blades or partitions 14 extend from the portion 13 to the outer periphery of the wheel. A cylinder 15 surrounds the wheel and contacts with the outer ends of the radial blades or partitions 14, this cylinder being preferably slightly larger than the lower end 4' of the ring 4. Division or partition plates 16 that operate as guide plates are located between alternate partitions 14, each one extending from the upper end of the cylinder 13 downwardly and outwardly to positions intermediate the center and the circumference of the wheel, so that the lower ends of these plates 16 will be approximately in line with the circular rim of the inlet 5 to the branch conduit 2. Other division or partition plates 17 that also operate as guide plates alternate with the plates 16 between the radial blades 14 and extend from the upper outer periphery of the wheel downwardly and inwardly so that their lower ends are on the circumference of the same circle as the lower ends of the plates 16. Clearly the guide plates 16 and 17 are non-radial. It will thus be seen that there are two sets of passageways through the wheel in an axial direction, the entries to each of the passageways being of substantially the same shape with one set of the passageways having one side sloping outwardly toward the circumference of the wheel and the other set having one side sloping inwardly toward the center of the wheel so that the outlets of one set of passageways are all outside of an intermediate circle and the outlets of all of the other passageways are inside of the same circle. In this way if the material arrives at the wheel through the conduit 1 with the solids concentrated along certain lines, the inlets to the passageways which are carried across the entire cross sectional area of the lower end of the ring 4 in the shaft 11 are revolved and will catch material from all portions of the conduit 1 and mix the same so that the mixture carried off by the branch conduits 2 and 3 will be substantially homogeneous.

The conduit 1 which is described above, forms a casing for the distributor, and above the distributor forms an inlet therefor. The inlet 5 to the branch conduit 3 and the annular space 7 comprise a plurality of outlets from the casing. The radial blades 14 extend from the inlet to the outlets.

It will be evident that the division or partition plates 16 form cone surfaces extending from the upper part of the central cylindrical portion 13 downwardly and outwardly of the distributor. The division or partition plates 17 also form cone surfaces which extend downwardly and inwardly of the distributor. The partitions 14 extend outwardly from these cone surfaces. Obviously, other arrangements of a similar character might be substituted for that which is here specifically described.

The wheel is provided with a bearing member 20 and a roller bearing 21 is provided between this member and the bearing 9 on the spider 8.

In the modification shown in Figs. 6 and 7 the shaft 11 and driving pulley 12 are dispensed with and the radially disposed plates 14' are curved along their lower portions circumferentially so that the material passing through the conduit 1 will impinge upon the curved surfaces and impart rotary motion to the wheel and thus cause the material to be mixed as it passes into the branch conduits.

I claim:

1. In a device for introducing air carrying solid particles in suspension from a main conduit into a plurality of branch conduits, a series of rotating plates forming two groups of passageways each group leading from said main conduit continuously to but one of said branch conduits in the direction of flow of material through the main conduit.

2. In a device for introducing air carrying solid particles in suspension from a main conduit into a plurality of branch conduits, a series of rotating plates forming passageways leading from said main conduit, some of said passageways leading to one of said branch conduits and others to another one.

3. In a device for introducing air carrying solid particles in suspension from a main conduit into a plurality of branch conduits, a series of rotating plates forming passageways leading from said main conduit, alternate passageways leading to one of said branch conduits and the others to the other conduit.

4. In a device for introducing air carrying solid particles in suspension from a main conduit into a plurality of branch conduits, rotatable means comprising a wheel, radially disposed blades on said wheel, and partition plates between said radially disposed blades forming separate passageways leading from said main conduit to each of said branch conduits.

5. In a device for introducing air carrying solid particles in suspension from a main conduit into a plurality of branch conduits, a rotatable wheel having partitions forming V-shaped passages extending in the direction of travel of the material through the conduits each passage formed by said partitions extending from said main conduit continuously to but one of said branch conduits.

6. In a device for introducing air carrying solid particles in suspension from a main conduit into a plurality of branch conduits, a rotatable wheel having radial partitions extending in the direction of travel of the material through the conduits and non-radial guide plates between said partitions.

7. In a device for introducing air carrying solid particles in suspension from a main conduit into a plurality of branch conduits, rotatable means having separate passageways leading from said main conduit to each of said branch conduits, said means comprising a wheel having radially disposed partitions, and said branch conduits having the inlet into one disposed within the inlet to another one.

8. In a device of the character described, a main conduit, two branch conduits one of which has its inlet within that of the other, and a rotatable wheel located at said inlets having conduits leading respectively to said inlets.

9. In a device of the character described, a main conduit, two branch conduits one of which has its inlet within that of the other, and a rotatable wheel located at said inlets having conduits leading respectively towards the center and circumference of said wheel.

10. In a device of the character described, a main conduit, two branch conduits, one of which has its inlet within that of the other, and a rotatable wheel located at said inlets having conduits with inlet openings all passing along the same path.

11. In a distributor for introducing gas carrying solid particles in suspension from a main conduit into a plurality of branch conduits, adjacent conoidal segments, radial blades extending outwardly from the edges of said conoidal segments, a main conduit for introducing gas carrying solid particles at one end of said conoidal segments and branch conduits for withdrawing gas carrying solid particles from the other end of said conoidal segments.

12. A distributing device comprising an inlet pipe, two branch outlet conduits, and walls forming localized passages arranged circumferentially of the pipe and connected alternately with the two outlet conduits.

13. A main conduit, and two concentric branch conduits in continuation of said main conduit, in combination with a distributor comprising radial blades forming the side walls of compartments, and plates forming the bottoms of alternate compartments, said bottom plates sloping inwardly and said distributor being thereby adapted to distribute material from said main conduit between said two concentric branch conduits.

14. In a distributor for introducing gas carrying solid particles in suspension from a main conduit into a plurality of branch conduits, adjacent conoidal segments, blades extending outwardly from the edges of said conoidal segments, a main conduit for introducing gas carrying solid particles at one end of said conoidal segments and branch conduits for withdrawing gas carrying solid particles from the other end of said conoidal segments.

15. Apparatus for distributing pulverized material transported in suspension in a gas stream comprising a casing having a material inlet arranged in one side thereof and a plurality of material branch outlets opening to said casing at points axially spaced from said inlet, a distributor wheel in said casing in axial alignment with said inlet, said wheel having angularly spaced axially extending blades mounted thereon and dividing the interior of said casing into a series of segmental chambers, baffle plates on said wheel extending between spaced pairs of adjacent blades and arranged to divide said series into a plurality of groups of separate chambers, and each of said groups of chambers being arranged to discharge into but one of said outlets.

HOWARD J. KERR.